United States Patent [19]
Vilain et al.

[11] Patent Number: 6,094,145
[45] Date of Patent: Jul. 25, 2000

[54] TELECOMMUNICATION MANAGEMENT SYSTEM

[75] Inventors: Bernard Vilain, Meudon; Candido Cimadevilla, Sceaux; Catherine Pontailler, Perros-Guirec, all of France

[73] Assignee: Alcatel Cit, Paris, France

[21] Appl. No.: 08/710,022

[22] Filed: Sep. 10, 1996

[30] Foreign Application Priority Data

Sep. 11, 1995 [FR] France .................................. 95 10606

[51] Int. Cl.[7] ................................................. G05B 23/02
[52] U.S. Cl. ..................................... 340/825.16; 370/216
[58] Field of Search ........................ 340/825.16, 825.08;
379/207, 230, 243, 201, 64, 89; 364/242.94,
229, 230, 284.3; 395/200.02, 200.09, 200.55,
200.67, 180, 181, 182.13, 182.14, 182.16,
750.02; 370/216

[56] References Cited

U.S. PATENT DOCUMENTS

| | | | |
|---|---|---|---|
| 4,878,196 | 10/1989 | Rose .................................. | 395/750.02 |
| 5,550,914 | 8/1996 | Clarke et al. ........................... | 379/230 |
| 5,579,384 | 11/1996 | Seymour ................................ | 379/243 |
| 5,678,006 | 10/1997 | Valizadeh et al. ................. | 395/200.02 |

FOREIGN PATENT DOCUMENTS

WO9318598  9/1993  WIPO .

OTHER PUBLICATIONS

Ejiri et al, "Operation Systems Architecture", *NTT Review*, vol. 3, No. 2, Mar. 1991, Tokyo, Japan, pp. 76–80.

Sevcik, "Adaptable TMN: A new dimension in practical management", *International Switching Symposium, Session C1, Paper 2*, vol. 1, Oct. 25, 1992, Yokohama JP, pp. 65–69.

Danan et al, "Intelligent switched network—management system", *IEEE Network Operations And Management Symposium, Session 18, Paper 2*, vol. 2, Apr. 6, 1992, Memphis US, pp. 533–544.

Callaghan et al, "RACE telecommunications management network architecture", *Electronics And Communication Engineerng Journal*, vol. 4, No. 5, Oct. 1992, London GB, pp. 314–322.

Sahin et al, "Telecommunications management Network (TMN) architecture and interworking designs", *IEEE Journal On Selected Areas In Communications*, vol. 6, No. 4 May 1988, New York, US, pp. 685–696.

*Primary Examiner*—Howard L. Williams
*Assistant Examiner*—Jean B. Jeanglaude
*Attorney, Agent, or Firm*—Sughrue, Mion, Zinn, Macpeak & Seas, PLLC

[57] ABSTRACT

A telecommunication management system including management centers provides management services which communicate via management messages in both directions with telecommunication network elements of a telecommunication network and a management message transfer point which enables the management centers and the telecommunication network elements to communicate, each in its own specific way, carries out the necessary conversion in the transfer of management messages between management centers and telecommunication network elements and is responsible for routing messages and making multiple copies of them in the case of messages with more than one destination. The message transfer point includes a plurality of management message transfer devices each serving a set of management applications and each telecommunication network element associated with a set of management applications has an interface for communicating with the management message transfer device serving that set.

10 Claims, 2 Drawing Sheets

TELECOMMUNICATION MANAGEMENT SYSTEM

BACKGROUND OF THE INVENTION

1. Field of the Invention

The present invention concerns a telecommunication management system.

2. Description of the Prior Art

A telecommunication management system is described in the "M30-M3000" series of Recommendations of the ITU-T (International Telecommunication Union—Telecommunication).

A telecommunication management system, or a telecommunication management network, enables the operator of a telecommunication network providing telecommunication services to users to implement management services relating to that network which, for the most part, consist either in obtaining information from that network (i.e., information relating to the services provided (for billing purposes, for example), the grade of service (waiting times, faults or failures, for example), the conditions under which these services are provided (statistics of all kinds)), or in inputting information into that network (i.e., information relating to the configuration of the telecommunication network and its equipment, to the services provided and their mode of use, etc.)

The structure of the telecommunication management system is based on the use of management centers providing these management services and which must communicate in both directions with telecommunication network elements of the telecommunication network. To be more precise, one or more management centers (also called operations systems (OS)) must communicate with various telecommunication network elements (NE). Each OS provides one or more management services, each of which is implemented by a management "application".

To this end, the telecommunication management system comprises a management data switching network separate from the telecommunication network to be managed, to which the various OS and the various NE are connected and which is responsible for routing management messages supporting the required communications between OS and NE. Additionally, in order to enable communication between OS and NE from different sources, the ITU-T is currently standardizing an interface for communication between OS and NE known as the Q3 interface.

The problem to which the present invention is addressed originates from the large number of different types of OS and NE in large modern telecommunication networks.

Because of the increased range of services offered, among other things, the management requirements of the operators are increasing at a considerable rate, which tends to increase the number of OS, even if each OS supports a plurality of management applications. Moreover, the larger the telecommunication network, the more varied the types of equipment that it incorporates (i.e., different manufacturers, different generations of equipment, different equipments with dedicated technical functions, etc).

The centralized solution just outlined implies that each OS identifies the many NE's individually and knows the details of each of them. It also implies that each NE knows the many management services, identifies an OS supporting each of those services and also knows its details. As a result, a considerable volume of information is required and has to be managed in the OS and in the NE. Also, each OS must satisfy the demands of all the NE, and each NE must satisfy the demands of all the OS, where the exchange of management information is concerned, which increases the number of management messages to be transmitted by both.

Moreover, the telecommunication network is continuously evolving and management operations are continually being added thereto. This leads to a requirement for frequent updating on the information relating to the telecommunication management network both in the OS and in the NE.

It is clear that such updates are costly, both in terms of the resources required to implement them and in terms of the load that they impose on the NE. It is important to restrict and to simplify updates.

For this reason, a telecommunication management system has been proposed incorporating, like the signalling transmission network incorporated in modern telecommunication networks, a management message transfer point with which the OS and the NE communicate in their own specific manner and which handles the necessary conversions. As a result, the OS and the NE no longer need to know each other's details. The management message transfer point is also responsible for routing messages and for making multiple copies of them in the case of messages having more than one destination. In this way a system of this kind takes centralized and more economic control over all the complex aspects that have represented a considerable load on the OS and the NE, as previously mentioned. In a large network, however, this leads to a large and costly management message transfer point.

The present invention is aimed at coping with such situations and to enabling centralized management of a large telecommunication network in a manner that further simplifies a management message transfer point of this kind.

SUMMARY OF THE INVENTION

The present invention therefore consists in a telecommunication management system comprising management centers and providing management services which communicate via management messages in both directions with telecommunication network elements of a telecommunication network. In addition, a management message transfer point is included which enables the management centers and the telecommunication network elements to communicate, each in its own specific way, carries out the necessary conversion in the transfer of management messages between management centers and telecommunication network elements and is responsible for routing messages and for making multiple copies of them in the case of messages with more than one destination. The message transfer point comprises a plurality of management message transfer devices each serving a set of management applications and each telecommunication network element associated with a set of management applications and has an associated interface for communicating with the management message transfer device serving that set.

It is therefore possible to constitute a set of applications relevant to only one category of telecommunication network elements and to associate a category of telecommunication network elements of this kind with that set by providing a message transfer device to which is connected, firstly, all of the applications of the set in question and, secondly, all of the telecommunication network elements of the category in question, with the result that the message transfer device has to handle only management communications between the two sets and can be optimized thereby reducing the cost of the telecommunication management system in the final analysis. Additionally, this enables the operator to control the flow of data at the level of the NE, by splitting up the data and enabling it to be made hierarchical, in order to avoid overloading the NE. This also increases the security of data transfer by dividing the load between a plurality of autonomous management message transfer devices. This introduces, at no additional cost, effective protection of the confidentiality of information, some applications prohibiting access to protected information.

In accordance with a further feature of the invention, a set of applications is served by a single management message transfer device.

In this way, access to the set of applications in question involves only a single management message transfer device, access by each telecommunication network element via a specific interface, thereby further simplifying the management message transfer device.

In accordance with another feature of the invention said management message transfer devices are of the same type.

In accordance with another feature of the invention the management message transfer devices are multiple instances of the same object.

The various objects and features of the invention will now be described in more detail through the following description of one embodiment of the invention given by way of non-limiting example with reference to the accompanying drawings.

DETAILED DESCRIPTION OF THE PREFERRED EMBODIMENT

Figure 1:
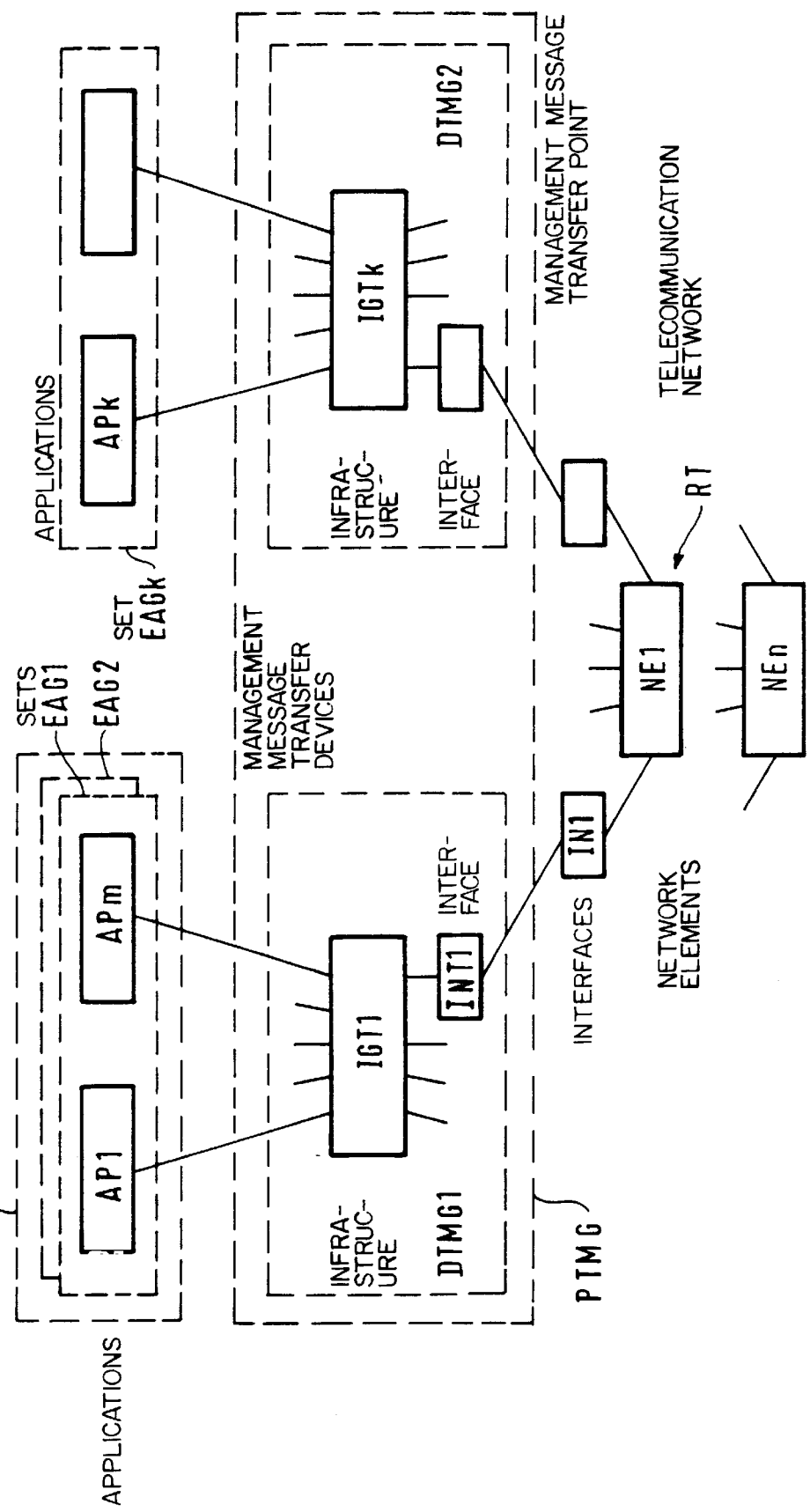
FIG. 1 shows the architecture of a telecommunication management system of the present invention.

As shown in FIG. 1, the telecommunication management system SGT comprises management centers CG1 providing management services by means of applications AP1, APm, and APk which require two-way communication by means of management messages with telecommunication network elements NE1, NEn of a telecommunication network RT and a management message transfer point PTMG with which the management centers and the telecommunication network elements communicate, each in its own specific way, which handles the necessary conversions in the transfer of management messages between management centers and telecommunication network elements, and which is also responsible for routing messages and for making multiple copies of them in the case of messages with more than one destination.

The management message transfer point is advantageously also responsible for backing up the management data. It then has a backed-up backing store (e.g. duplication of records, error control and protection switching from one record to another in the event of an error). A memory of this kind can hold the data of messages in transit until they have been forwarded in their entirety, retain a record of all messages transmitted in a given period (for example in order to be able repeat them in the event of a subsequent fault in the applications or in the telecommunication network elements) or provide long-term storage for this data. In the latter case, the management message transfer point could completely decouple the management applications from the telecommunication network elements, for example receiving billing data from subscriber switching centers "on the fly", storing this data without forwarding it and then responding to requests for stored data from the billing applications. This relieves the switching centers of the task of backing up such data and of responding in real time to requests from billing management applications, these functions being transferred to a centralized and therefore more economic management message transfer point.

The message transfer point PTMG comprises a plurality of management message transfer devices DTMG1, DTMGk each serving a set of management applications EAG1, EAGk and telecommunication network elements NE1, etc. Each telecommunication network element NE1, NEn associated with a set of management applications has an interface (e.g. IN1) to communicate with the management message transfer device serving that set. This interface preferably conforms to the Q3 interface previously mentioned. In each management message transfer device (e.g. DTMG1) a telecommunication management infrastructure IGT1 in the form of a conventional data message switch communicates with telecommunication network elements (e.g. NE1) via an interface (e.g. INT1) that can also be of the Q3 type. Communications between the applications (e.g. AP1, APm) of the same set and the telecommunication management infrastructure IGT1 serving them naturally comprise appropriate interfaces, not shown here to simplify the drawings, as they are conventional in this art; these are also Q3 type interfaces.

The set of management applications EAG1 is implemented in the management center CG1. A second set EAG2 served by a second management message transfer device (not shown) may be included in the same management center CG1.

A set of management applications e.g. EAG1 is made up of management services which are similar from the point of view of the telecommunication network elements NE1, NEn of the telecommunication network RT. The set EAG1 may comprise the call billing services applications, for example. This set would include a billing application for each type of telecommunication service (conventional telephony, videophones, data, fax, etc). Not all network elements of the telecommunication network RT are relevant from the billing point of view. As a general rule, only subscriber switching centers are relevent, whereas transit centers, trunk time slot interchange units, etc are not. There is, therefore a category of telecommunication network elements (e.g. NE1) which have the common feature of being the only ones relevant to the set of billing services and which must communicate with the set of billing applications EAG1. The telecommunication network elements of this category are associated with this set of billing applications by the message transfer device DTMG1 to which are connected, firstly, all of the applications of the set AP1, APm and, secondly, all of the telecommunication network elements (e.g. NE1) of the category in question, with the result that the management message transfer device DTMG1 handles only management communications relating to billing and is optimized accordingly.

The set of applications EAG1 is preferably served by the single management message transfer device DTMG1. Seen from a relevant telecommunication network element (e.g. NE1), the setting up of a call with an application of this set therefore merely entails sending a message to the interface IN1.

Another set of management applications (e.g., EAGk), covers traffic measurements such as the application APk in particular. Once again, not all telecommunication network elements are relevant to traffic measurements. This applies to trunk time slot interchange units, for example. Other telecommunication network elements are relevant both to billing and to traffic measurements, however, and are connected to both management message transfer devices DTMG1 and DTMGk via two different interfaces, as is the case for NE1.

In practise, the management message transfer devices are advantageously all of the same kind. Only their dimensions and their parameters change from one device to another. Each implements, for a group of applications, the functions mentioned above that are allocated to the management message transfer point.

In a network in which the management message traffic allows it, various message transfer devices can be implemented on the same machine. These various devices are advantageously multiple instances of a common object. This may apply, in particular, at the level of the management message transfer infrastructures IGT1, IGTk, for example.

The various applications served by the same message transfer device are advantageously supported by the same management center.

Figure 2:
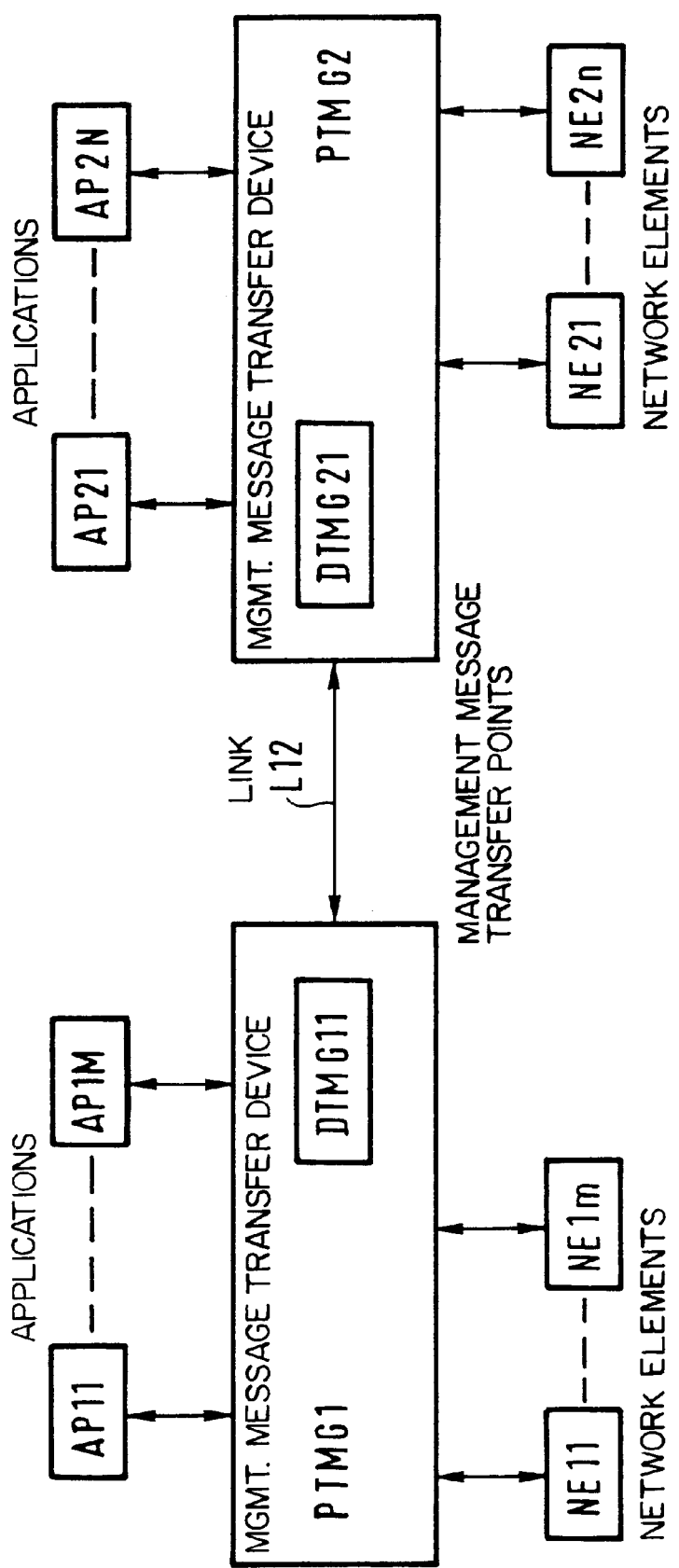
FIG. 2 shows a telecommunication management system comprising a plurality of management message transfer points.

Turning now to FIG. 2, consider the case of a network of such size that a single management message transfer point is no longer sufficient. In this case, the invention provides a plurality of them, interconnected in pairs. For simplicity, FIG. 2 shows only two management message transfer points PTMG1 and PTMG2 interconnected by a link LT12. Each of them is similar to the transfer point PTMG from FIG. 1. The management message transfer point PTMG1 serves applications AP11 through AP1M and telecommunication network elements NE11 through NE1m. The management message transfer point PTMG2 serves management applications AP21 through AP2N and telecommunication network elements NE21 through NE2n. The link LT12 is essentially to enable the transfer of management messages between the applications AP11 through AP1M and the telecommunication network elements NE21 through NE2n and/or between the applications AP21 through AP2N and the telecommunication network elements NE11 through NE1m. To this end one or more management message transfer devices of each of the management message transfer points PTMG1 and PTMG2 is connectable to the link LT12 over which it can transmit or receive management messages in an addressable manner, instead of transmitting them to or receiving them from applications to which they are directly connected.

To be more precise, one such management message transfer device DTMG11 of the management message transfer point PTMG11 and one such management message transfer device DTMG21 of the management message transfer point PTMG2 are shown by way of example. When the device DTMG11 receives from the telecommunication network element NE11 a management message addressed to the management application AP21, the message is forwarded by the device DTMG11 over the link LT21 and addressed to the device DTMG21 that is responsible for transferring it to the application AP21. In this context, a device DTMG11 is a management message transfer device similar to the others from the point of view of the network elements that it serves, and implements all of the functions already described, but it does not comprise any application that is directly connected to it; also, instead of transmitting management messages to such applications, it places the management messages that it generates on the link LT12 and the management message transfer device DTMG21 then provides a transmission relay between the link LT12 and the applications that are relevant to the management message transfer device DTMG11 but that are accessible only via the management message transfer point PTMG2.

It is naturally possible to use a symmetrical arrangement in which the device DTMG11 merely forwards management messages from telecommunication network elements connected to it, without taking any action on them, the device DTMG21, on the other hand, processing these messages totally and implementing in respect of them the functions previously described.

What is claimed is:

1. A telecommunication management system comprising:
    management centers providing management services and which communicate via management messages in both directions with telecommunication network elements of a telecommunication network, and
    a management message transfer point which is used by the management centers and the telecommunication network elements to communicate, each in its own specific way, which carries out the necessary conversion in the transfer of management messages between management centers and telecommunication network elements, and which is responsible for routing messages and for making multiple copies of the messages in the case of messages with more than one destination,
    wherein said message transfer point comprises a plurality of management message transfer devices each serving a respective set of management applications, and each telecommunication network element is associated with a set of management applications relevant thereto and has an associated interface for communicating with management message transfer device serving that set.

2. The telecommunication management system claimed in claim 1 wherein a set of applications is served by a single management message transfer device.

3. The telecommunication management system claimed in claim 1 wherein said management message transfer devices are of the same type.

4. The telecommunication management system claimed in claim 1 wherein said management message transfer devices are multiple instances of the same object.

5. The telecommunication management system claimed in claim 1 wherein the applications served by the same message transfer device are supported by the same management center.

6. The telecommunication management system claimed in claim 1 wherein said message transfer point comprises memory means for backing up management data carried by said management messages.

7. The telecommunication management system claimed in claim 6 wherein said backing up means temporarily store the data of said management messages until they are forwarded completely.

8. The telecommunication management system claimed in claim 6 wherein said backing up means temporarily store the data from management messages for a fixed time sufficient to cover failures at the receiver and processing of the messages transmitted.

9. The telecommunication management system claimed in claim 6 wherein said backing up means provide long-term storage of data received by said management message transfer point and deferred forwarding of the data stored in this way.

10. The telecommunication management system claimed in claim 1 comprising at least a second management message transfer point connected to the first by a management message transmission link enabling transfers of management messages between the applications of one of them and the telecommunication network elements of the other and vice versa.

* * * * *